Aug. 17, 1965  F. R. GRUNER  3,200,950
LAUNDRY MACHINES
Filed Jan. 17, 1963

INVENTOR.
FREDERICK R. GRUNER
BY
*Robertson & Smythe*
ATTORNEYS.

United States Patent Office 3,200,950
Patented Aug. 17, 1965

3,200,950
LAUNDRY MACHINES
Frederick R. Gruner, Moline, Ill., assignor to Ametek, Inc., New York, N.Y., a corporation of Delaware
Filed Jan. 17, 1963, Ser. No. 252,205
4 Claims. (Cl. 210—364)

The present invention relates to washer-extractors and particularly to an improved vibration absorbing mounting means therefor.

Problems arise in the use of washer-extractors, particularly those of commercial size, when used on floors of a building substantially above ground level where the building floor must absorb the vibrations incident to unbalanced loads within the extractor.

The principal object of this invention is to provide a washer-extractor with a simple, inexpensive vibration absorbing mounting that will overcome the problem of requiring the flooring to absorb excessive vibrations developed by the operation of washer-extractors.

Another object of the invention is to provide such a vibration absorbing mounting that will have a long life and be free of failures.

Still another object of the invention is to provide such a vibration absorbing mounting having the capacity to absorb low-frequency vibrations.

Still another object of the invention is to provide such a vibration absorbing mounting in which heavy-duty, shear-type rubber mountings are employed in combination with adjustable friction producing means.

In one aspect of the invention, a washer-extractor may comprise a housing or frame that supports interiorly a basket for rotation about a horizontal axis. A structural framework may extend along opposite sides of the housing and around each corner thereof.

In another aspect of the invention, shear-type rubber mounting means may extend between, and be connected to the housing and structural framework.

In still another aspect of the invention, the structural framework may support an adjustable friction producing shoe means adapted to contact the housing at points in close proximity to the location of the shear-type rubber mountings, and such that the frictional force produced thereby is in a plane parallel to the shear planes of the rubber mountings.

The above, other objects and novel features of the invention will become apparent from the following specification and accompanying drawing which is merely exemplary.

Figure 1:
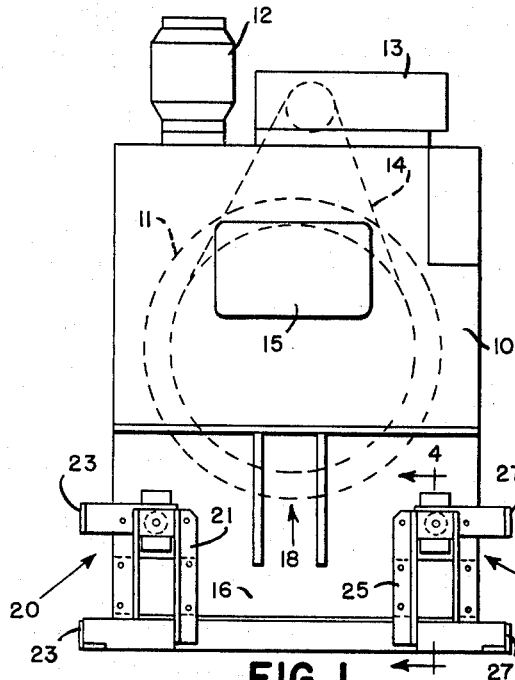
FIG. 1 is a front elevational view of a washer-extractor to which the principles of the invention have been applied.

Referring to the drawings, and particularly to FIG. 1, the principles of the invention are shown as applied to a washer-extractor including a housing 10 within which may be mounted a basket 11 rotatable about a horizontal axis. A fan 12 may be mounted on top of the housing 10 for withdrawing vapor from within the housing. A motor 13 may rotate basket 11 through suitable belting 14. A door 15 may be provided through which materials to be treated can be inserted into the basket 11.

Front and back walls 16 and 17 may be provided with reinforcing web means 18 and 19. A structural framework 20 may comprise standards 21 and 22 at the front and back of housing 10 on the lefthand side thereof. The standards 21 and 22 may be connected by structural steel members 23 extending along the lefthand side of housing 10. A similar structural framework 24 may include standards 25 and 26 joined by members 27.

Figures 5, 6:
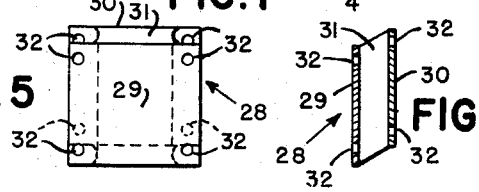
FIG. 5 is an elevational view of one of the shear-type rubber mounting members.
FIG. 6 is an end view of the mounting shown in FIG. 5.

Each of the standards 21, 22, 25 and 26 may support a series of shear-type rubber mounting members 28. Referring to FIGS. 5 and 6, these mounting members may comprise parallel spaced, metallic plates 29 and 30 between which is bonded a body of rubber 31. The plates 29 and 30 may be displaced so that they are somewhat out of alignment, but still in parallel relation, before the rubber body 31 is vulcanized or otherwise fixed thereto. Accordingly, with one plate fixed and a load applied to the other in the correct direction, the plates move toward an aligned position. The shear-type of rubber mounting that has been found to be particularly advantageous is that which is sold by the United States Rubber Company under the designation "No. 1103A." Additionally, during assembly, the shear mountings are preferably so arranged that the rubber is placed slightly in compression to prevent any failures in the bond of the rubber to the metal plates.

Although one or more of the shear-type rubber mountings may be employed between the standard 21 and the housing 10, in the embodiment disclosed, three such mountings are shown in series relation. The metallic plates of each mounting extend beyond the extent of the body of rubber 31 so as to provide a margin therearound through which holes 32 extend for receiving bolts 33.

Figure 2:
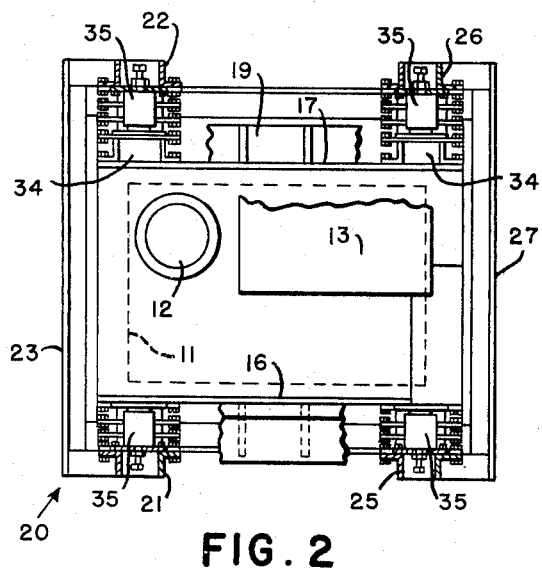
FIG. 2 is a top plan view of the extractor shown in FIG. 1.
Figure 4:
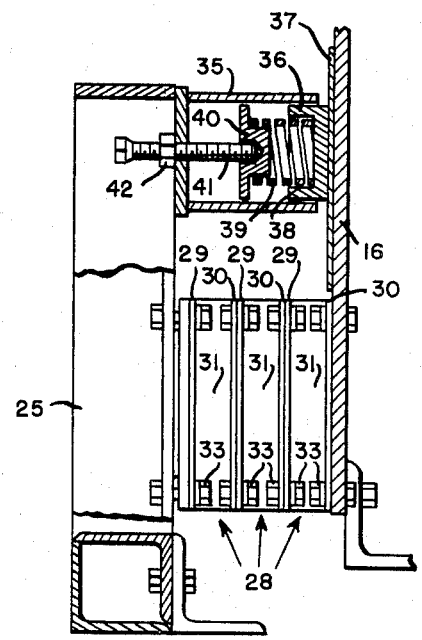
FIG. 4 is a sectional view taken substantially along line 4—4 of FIG. 1.
Figure 3:
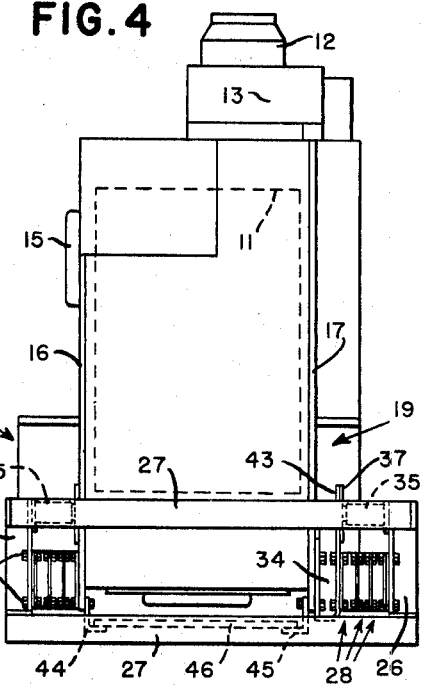
FIG. 3 is an end view of the extractor shown in FIG. 1.

Referring to FIG. 4, the series of shear-type rubber mountings are shown as bolted together with their end plate 29 bolted to the standard 25 and their end plate 30 bolted to the wall 16. There is a like arrangement at each corner of the housing 10. However, since the framework including members 23 is designed for various sized extractors, and the one shown is not the largest size, a spacer member 34 (FIG. 3) is provided between the housing 10 and the innermost mounting member 28 at each corner of the back of housing 10.

Each of the standards 21, 22, 25 and 26 extends above the shear-type rubber mountings 28 and has bolted or screwed to it a cylinder 35 adapted loosely to receive a piston 36 preferably made of friction material. A friction plate 37, preferably of stainless steel, may be welded or otherwise fastened to the walls 16 and 17, although such plate may be dispensed with if desired. The piston 36 includes a chamber 38 for receiving a compression spring 39, into the exposed end of which a member 40 is received. An adjusting screw 41 acts on the end of member 40 is threaded through the bottom plate of cylinder 35. A locking nut 42 is provided for locking the screw 41 in adjusted position to provide a predetermined resilient force acting to hold piston 36 in frictional contact with plate 37. There are identical friction producing means at each corner of housing 10 above the corresponding shear-type rubber mounting.

The frictional plates 37 of the friction producing means at the back of the housing 10 are welded or otherwise fastened to an extension 43 of the spacer member 34, which latter are bolted to the back plate 17 as previously described.

During normal operation, the small clearance between cylinder 35 and piston 36 permits motion to take place between these two parts because shear mounting 31 will move through small amplitudes with average unbalanced loads in the basket 11. Piston 36 stays in substantially fixed relationship to plate 37 and wall 16 under these conditions. However, when severe unbalance in the basket 11 is present, the amplitude of vibrations will be greater than the clearance between piston 36 and cylinder 35.

This motion will cause plate 37 to carry piston 36 along with it until the piston contacts cylinder 35; then motion will take place between piston 36 and plate 37. The friction force generated on these surfaces will oppose the motion of the housing including plate 37 and wall 16, thereby preventing excessive amplitudes of motion.

Referring again to FIG. 3, angle members 44 and 45 may be fixed to the bottom of housing 10 along the bottom of front and back walls 16 and 17. One or more heavy plates 46 may be supported by, and bolted to the angles 44 and 45 to provide an inertia means for maintaining the amplitude of the vibrations, due to unbalanced loads, within a reasonable limit to provide long life of the rubber mountings.

Although the various features of the improved vibration absorbing means have been shown and described in detail to fully disclose one embodiment of the invention, it will be evident that changes may be made in such details and certain features may be used without others without departing from the principles of the invention.

What is claimed is:

1. In a washer-extractor, a housing; a basket mounted in said housing for rotation about a horizontal axis; a structural base framework along opposed side walls of said housing, said framework including mounting faces that lie in planes that are transverse to the axis of rotation of said basket; shear-type rubber mountings located between said mounting faces and said housing such that the shear planes thereof are parallel to the plane of rotation of said basket; resiliently mounted shoe means between said framework and said housing for providing a frictional resistance within planes parallel to the plane of rotation of said basket; and heavy inertia means fixed to the bottom of said housing.

2. In a washer-extractor, a housing; a basket mounted in said housing for rotation about a horizontal axis; a structural base framework along opposed side walls of said housing, said framework including mounting faces that lie in planes that are transverse to the axis of rotation of said basket; shear-type rubber mountings located between said mounting faces and said housing such that the shear planes thereof are parallel to the plane of rotation of said basket; a cylinder having one end open and the other closed, fixed to said framework and spaced from said rubber mountings; a piston mounted within said cylinder and having a friction producing face adapted to contact a surface on said housing that lies in a plane transverse to the axis of rotation of said basket; and adjustable spring means between said piston and the closed end of said cylinder.

3. In a washer-extractor, a housing; a basket mounted in said housing for rotation about a horizontal axis; a structural base framework along opposed side walls of said housing, said framework including mounting faces that lie in planes that are transverse to the axis of rotation of said basket; shear-type rubber mountings located between said mounting faces and said housing such that the shear planes thereof are parallel to the plane of rotation of said basket; a cylinder having one end open and the other closed, fixed to said framework and spaced from said mountings; a piston mounted within said cylinder and having a friction producing face adapted to contact a surface on said housing that lies in a plane transverse to the axis of rotation of said basket; adjustable spring means between said piston and the closed end of said cylinder; and heavy inertia means fixed to the bottom of said housing.

4. In a washer-extractor, a housing; a basket mounted in said housing for rotation about a horizontal axis; a structural base framework along opposed side walls of said housing, said framework including mounting faces that lie in planes that are transverse to the axis of rotation of said basket; shear-type rubber mountings located between said mounting faces and said housing such that the shear planes thereof are parallel to the plane of rotation of said basket, said rubber mountings comprising parallel misaligned plates having a body of rubber therebetween and integrally joined thereto; a cylinder having one end open and the other closed, fixed to each corner of said framework, a piston mounted within said cylinder and adapted to contact a surface on said housing that lies in a plane transverse to the axis of rotation of said basket; and adjustable spring means between said piston and the closed end of said cylinder.

References Cited by the Examiner

UNITED STATES PATENTS

| | | | |
|---|---|---|---|
| 2,467,110 | 4/49 | Breisch | 248—18 X |
| 2,637,189 | 5/53 | Douglas | 68—24 |
| 2,655,005 | 10/53 | Kinneman | 61—48 |
| 2,936,983 | 5/60 | Markestein et al. | 248—119 |

FRANK B. SHERRY, *Primary Examiner.*